United States Patent
Joye et al.

(10) Patent No.: US 7,149,763 B2
(45) Date of Patent: Dec. 12, 2006

(54) METHOD FOR GENERATING A RANDOM PRIME NUMBER WITHIN A PREDETERMINED INTERVAL

(75) Inventors: Marc Joye, Saint Zacharie (FR); Pascal Paillier, Paris (FR)

(73) Assignee: Gemplus, Gemenos Cedex (FR)

( * ) Notice: Subject to any disclaimer, the term of this patent is extended or adjusted under 35 U.S.C. 154(b) by 708 days.

(21) Appl. No.: 10/236,942

(22) Filed: Sep. 9, 2002

(65) Prior Publication Data

US 2004/0049526 A1 Mar. 11, 2004

(51) Int. Cl.
G06F 7/58 (2006.01)
(52) U.S. Cl. ..................................... 708/250
(58) Field of Classification Search ......... 708/250–256
See application file for complete search history.

(56) References Cited

U.S. PATENT DOCUMENTS 6,141,668 A * 10/2000 Shimada ..................... 708/250
6,718,536 B1 * 4/2004 Dupaquis .................... 717/126

FOREIGN PATENT DOCUMENTS

WO 02/05483 A1 1/2002

OTHER PUBLICATIONS

John B. Friedlander et al., "Small Values of the Carmichael Function and Cryptographic Applications", pp. 1-8.
Fischer Harald et al., "Power Permutations on Prime Residue Classes", pp. 191-197.

* cited by examiner

Primary Examiner—D. H. Malzahn
(74) Attorney, Agent, or Firm—Buchanan Ingersoll & Rooney PC

(57) ABSTRACT

A random prime number is generated within a predetermined interval by precalculating and storing a single value that functions as a universal parameter for generating prime numbers of any desired size. The value, $\pi$, is chosen as a product of k prime numbers. A number a is also chosen such that is co-prime with $\pi$. Once the values for $\pi$ and a have been determined they can be stored and used for all subsequent iterations of the prime number generating algorithm. To generate a prime number, a random number x is chosen with uniform distribution, and a candidate prime number within the predetermined interval is calculated on the basis of the random number. This candidate is tested for primality, and returned as the result if it is prime. If the candidate is not prime, the random number x is multiplied by a, and used to generate a new candidate. This procedure is repeated, until the candidate is prime. Since a single value, namely $\pi$, needs to be precalculated, economies of storage are achieved. In addition, the interval of interest is approximated with a higher degree of resolution. Moreover, it is possible to utilize the same value of $\pi$ for a number of different intervals.

16 Claims, 3 Drawing Sheets

METHOD FOR GENERATING A RANDOM PRIME NUMBER WITHIN A PREDETERMINED INTERVAL

FIELD OF THE INVENTION

The present invention relates to the generation of electronic keys for use in public key cryptography, and more particularly to the generation of a random number, for use in constructing such keys, that is particularly well suited for an environment having limited processing resources such as portable electronic device.

BACKGROUND OF THE INVENTION

A variety of public key cryptography protocols are known for encoding information, authenticating entities to one another, and electronically signing messages. Examples of such protocols include RSA, El Gamal, Schnorr and Fiat Schamir. A common feature of public key cryptography protocols is the fact that they employ large prime numbers, with typical lengths in the range of 512–2048 bits, to form one or more keys of the protocol. Some of these cryptosystems, such as RSA for example, require the random generation of several distinct prime numbers. Thus, generating prime numbers is an essential tool in public key cryptography.

When efficiency is not a concern, one of the simplest ways to generate a random prime number is to select a random number q and test it for primality. If the test is unsuccessful, the value for q is incremented by one, and the test is rerun. Since all prime numbers except two are odd, a straightforward improvement on this technique is to choose q as an odd value, and to update it in increments of two for each successive iteration of the test. However, this technique can become computationally intensive and is therefore not practical in a number of situations when large-sized numbers are employed.

To facilitate the random number selection process, several techniques have been developed that make it possible to more efficiently calculate the greatest common denominator of two numbers, and thereby determine whether they are co-prime. Examples of those techniques include Binary GCD, Extended GCD and the Lehmer formula. While these techniques exhibit excellent asymptotic complexity for numbers of extremely large size, they are difficult to program in an environment having limited processing resources, such as a smart card or other portable electronic device. In addition, they provide relatively poor performance for operations involving numbers of the size typically employed in the smart card environment, e.g. in the range of 512 to 1024 bits. To increase the performance, it is possible to equip the card with an arithmetic coprocessor to carry out some of the operations of the primality test. However, other operations that are performed as part of the test, such as parity checking and binary shifts, are not compatible with the functionality typically offered in an arithmetic coprocessor. As a result, the overall performance still suffers.

To address these issues, one technique for generating a random prime number is disclosed in published PCT Application WO 02/05483, the contents of which are incorporated herein by reference. This application discloses a method for generating an electronic key from a prime number q contained in a specific interval of positive integers $[q_{min}, q_{max}]$. In this method, a positive integer x is chosen with x being the product of k prime numbers, where k is a maximum so that there exist two positive integers $\epsilon_m$ and $\epsilon_M$, such that $\epsilon_m$ is the higher roundoff of $q_{min}/x$, and $\epsilon_M$ is the lower roundoff of $(q_{max}-q_{min})/x$. The values $\pi = \epsilon_M \cdot x$ and $\rho = \epsilon_m \cdot x$ are calculated, and two positive integers a and c belonging to the multiplicative group $Z_\pi^*$ of integers (modulo $\pi$) are selected. Once these precalculations have been made, a candidate value $q = c + \rho$ is calculated, and the primality of q is tested. If q is a prime number, it is returned, or stored, as the random prime number of interest. Otherwise, c is updated by calculating ac (modulo $\pi$) and repeating the preceding operation with the new value $q = c + \rho$.

A limitation associated with this approach can arise from the fact that the precalculated data approximates the interval $[q_{min}, q_{max}]$ only when the value for $\rho$ is close to $q_{min}$ and the value for $\rho + \pi$ is close to $q_{max}$. The values for $\pi$ and $\rho$ are therefore a function of the desired interval. A different interval requires a different set of precalculated values. The need to store all of these values may be undesirable in an environment having limited storage capacity, such as a portable electronic device.

It is an objective of the present invention to reduce the number of precalculated values, and thereby achieve an economy of storage. It is a further objective to provide a finer approximation of the interval $[q_{min}, q_{max}]$ of interest, while utilizing a value for $\pi$ that can be applied over a number of different intervals.

SUMMARY OF THE INVENTION

The present invention generates a random prime number within a predetermined interval by precalculating and storing a single value that functions as a universal parameter for generating prime numbers of any desired size. In accordance with the invention, a number $\pi$ is chosen that is the product of k prime numbers. This number is chosen such that (a) k is a maximum and (b) the ratio $(q_{max}-q_{min}-\pi)/(q_{max}-q_{min})$ is lower than a desired limit. A number a is also chosen such that the greatest common denominator of a and $\pi$ is equal to 1, i.e. a is co-prime with $\pi$. Once the values for $\pi$ and a have been determined they can be stored, for example in a ROM or EEPROM, and used for all subsequent iterations of the prime number generating algorithm.

The algorithm for generating a random prime number within an interval $[q_{min}, q_{max}]$ then comprises the following steps:

1. Chose a random number $x < \pi$ with uniform distribution, such that the greatest common denominator of x and $\pi = 1$;
2. Calculate $q = (x - q_{min}) \mod \pi + q_{min}$;
3. Test whether q is prime, and if so return q;
4. Otherwise, calculate $x = ax \mod \pi$;
5. Proceed to step 2.

Since a single value, namely $\pi$, needs to be precalculated, economies of storage are achieved. In addition, the interval of interest is approximated with a higher degree of resolution. Moreover, it is possible to utilize the same value of $\pi$ for a number of different intervals.

Further features of the invention are explained in detail hereinafter, with reference to exemplary embodiments illustrated in the accompanying drawings.

BRIEF DESCRIPTION OF THE DRAWING FIGURES

DETAILED DESCRIPTION OF THE INVENTION

To facilitate an understanding of the invention, it is described hereinafter with reference to its implementation in a smart card having a microprocessor. It will be appreciated, however, that the smart card is exemplary of a variety of different types of portable electronic devices for which the invention is particularly suited, and therefore this illustrative description should not be construed as limiting the invention in any manner.

In the implementation of public key cryptography protocols, such as the RSA algorithm, for example, it is necessary to select a pair of integers p,q of given length that are co-prime with each other, for use in generating electronic keys for the protocol. To ensure that the selected numbers are co-prime with each other, a step of verifying co-primeness is performed. In the case of a portable electronic device with a microprocessor, such as a smart card, the test is performed within the card. Examples of tests for verifying the co-primeness are set forth, for example, in IEEE 1363 standard for public-key cryptography, and in ISO/IEC WD 18032 working draft of Apr. 18, 2001.

In practice, in the RSA protocol, confidentiality of the keys is ensured when the two integer numbers p and q are prime with each other and have a fixed length, for example, 512 or 1024 bits each. Typically, one of the two numbers p is an integer number that is selected in advance from amongst a set of numbers stored in the microprocessor card. The other number q is generated in a random fashion by the microprocessor card when the protocol is to be executed. For this purpose, the microprocessor card has a random number generator that is capable of supplying an integer number of the requisite size.

Figure 1:
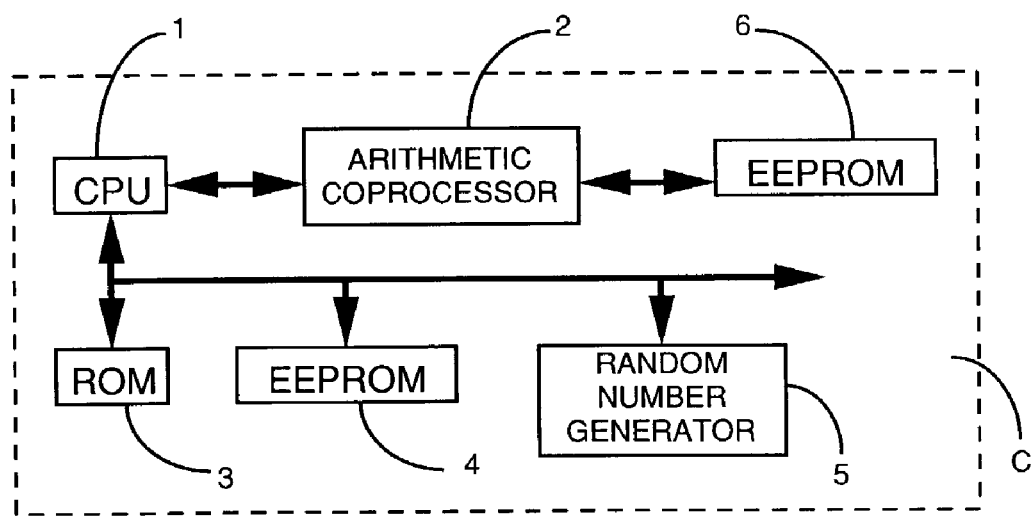
FIG. 1 is a block diagram of a portable electronic device, such as a smart card, in which the present invention can be implemented.

FIG. 1 is a block diagram of an exemplary smart card within which the present invention can be implemented. The card has a central processing unit 1, program memories 3 and 4, and working memory (not shown) associated with the central processing unit 1. At least one of the program memories contains a program for generating random prime numbers in accordance with the present invention. The card has an arithmetic coprocessor 2 that is capable of performing modular exponentiation calculations. Examples of suitable coprocessors that can be employed for this purpose include ST Microlock Electronics Model ST16CF54 and Phillips Model 83C852/5. The card also includes a random number generator 5.

The present invention generates a prime number q within the interval $[q_{min}, q_{max}]$. In a preferred embodiment of the invention, the generated prime number complies with the ISO/IEC standard described previously. In a typical case, $q_{max}=2^n-1$, and $q_{min}=2^{n-1}+1$, to generate n-bit primes. Alternatively, $q_{min}=\sqrt{(2^{2n-1}+1)}$, to generate 2n-bit RSA moduli of the form N=pq, with p and q being prime numbers. A general approach to the generation of prime numbers is described hereinafter, followed by a more refined approach in accordance with a preferred embodiment of the invention.

The generation of a prime number in accordance with the present invention comprises a setup phase and an implementation phase. For the setup phase, let $0<\epsilon\leq 1$ denote a quality parameter, wherein a typical value for $\epsilon$ is $10^{-3}$. The setup phase calculates a product of primes $\pi=\Pi_i p_i$ such that there exist integers t, v and w that satisfy the following properties:

$$1-\epsilon < \frac{w\pi-1}{q_{max}-q_{min}} \leq 1;\quad\quad (P1)$$

$$v\pi+t \geq q_{min} \quad\quad (P2)$$

$$(v+w)\pi+t-1 \leq q_{max};\text{ and} \quad\quad (P3)$$

the ratio $\phi(\pi)/\pi$ is as small as possible. $\quad\quad$ (P4)

where $\phi(x)$ is Euler's totient function defined for any number x with prime factorization $x=\Pi p_i^{ei}(e_i\geq 1)$ as $\phi(x)=\Pi p_i^{ei-1}(p_i-1)$.

Figure 2:
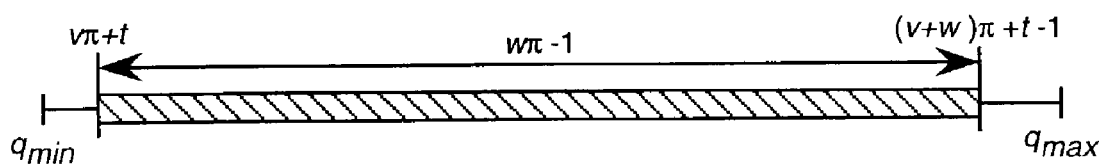
FIG. 2 is an illustration of an interval within which prime numbers are generated.

Referring to FIG. 2, the interval of interest is designated by the values $q_{min}, q_{max}$. If the prime number q is to have a value of 1024 bits, for example, then $q_{min}=2^{1023}+1$ and $q_{max}=2^{1024}$. The prime numbers that are generated by the algorithm lie within the subinterval $[v\pi+t, (v+w)\pi+t-1]$. The difference in these two intervals is represented by the value of $\epsilon$. A smaller value for $\epsilon$ produces better results, i.e. a closer approximation to the interval of interest. The minimality of the ratio $\phi(\pi)/\pi$ in the fourth property ensures that $\pi$ contains a maximum number of prime numbers.

Figure 3:
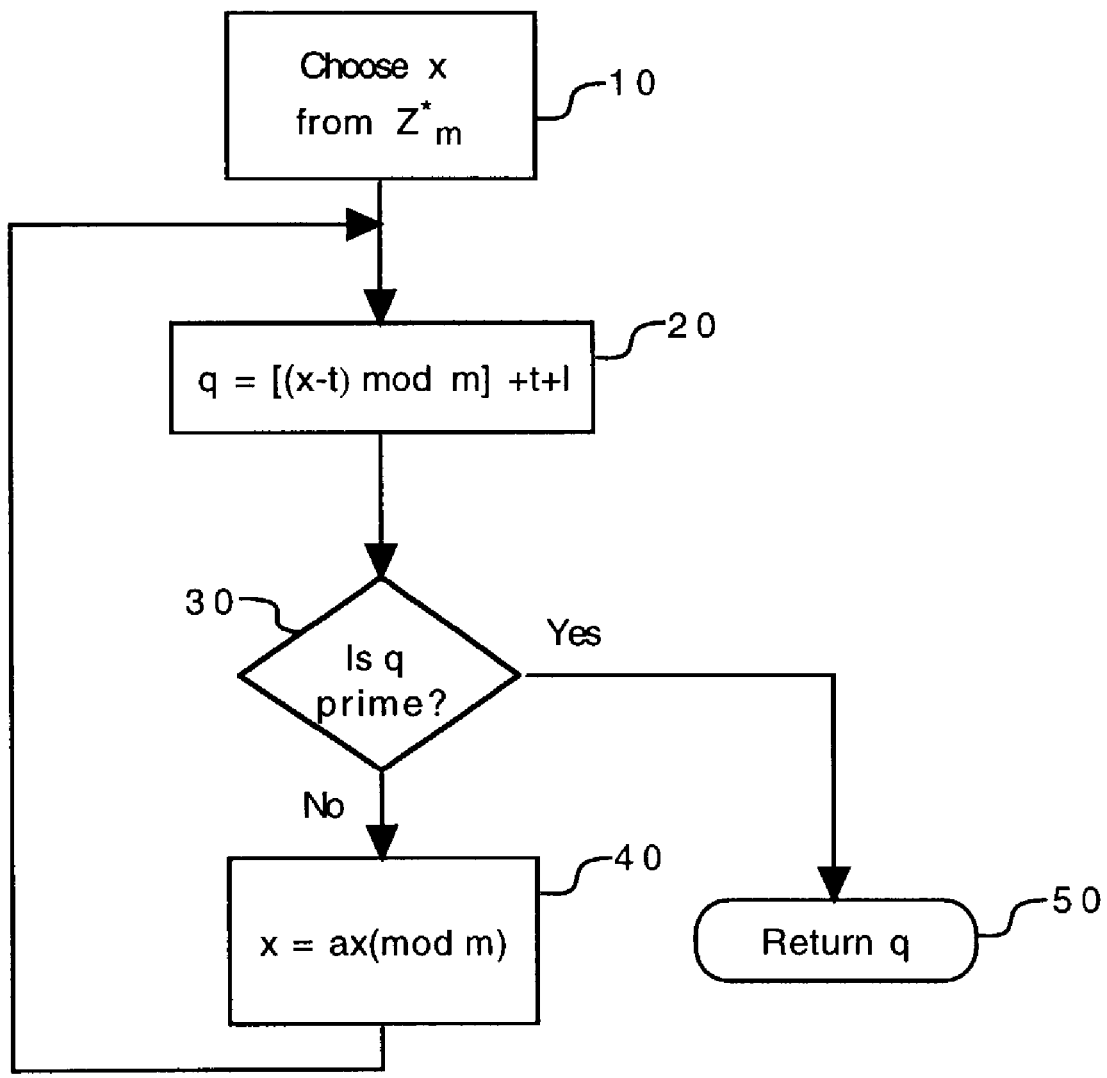
FIG. 3 is a flow chart illustrating a first exemplary embodiment of the invention.

The general algorithm is represented in the flow chart of FIG. 3. As inputs to the algorithm, the parameters $l=v\pi$ and $m=w\pi$ are calculated and stored. At step 10, using the random number generator 5, a number x is randomly chosen with uniform distribution from a multiplicative group of units $Z_m^*$, i.e. the set of invertible elements modulo m. These units might be generated according to the procedure described in copending application Ser. No. 10/214,753, the disclosure of which is incorporated herein by reference. At step 20, q is set to be equal to the value $[(x-t)\bmod m]+t+l$. At step 30, a test is conducted to determine whether q is prime. This test can be performed in accordance with any known procedure for determining primality. If q is not prime, then the value for x is set to ax(mod m) at step 40, and the process returns to step 20. Once q is found to be prime at step 30, it is output at step 50. This value is then used to generate a cryptographic key, in accordance with known procedures.

It is worth noting that if both a and x are elements of the set of units $Z_m^*$, their product ax is likewise an element of this set, since it is a multiplicative group. Thus, for each implementation of the algorithm, x remains co-prime to m and thus to $\pi$. This, in turn, implies that q is co-prime to $\pi$ since $q=[(x-t)\bmod m]+t+l=x \pmod \pi$, and x is an element of multiplicative group $Z_\pi^*$. Consequently, the probability that a candidate q is a prime number at step 30 is high.

This algorithm can be refined to increase the speed with which it is performed. The optimal value for t is t=0. Furthermore, it is advantageous to select a so that multiplication by a modulo $\pi$ does not require significant computational resources. The best value is a=2. However, 2 must belong to $Z_\pi^*$ and, due to the fourth property (P4) described previously, 2 is a factor of $\pi$, which is a contradiction. The next best approach, therefore, is to select an odd value for $\pi$, so that 2 belongs to $Z_\pi^*$, and to revise the algorithm so that q is always odd. This means that $\pi=\pi_i \, p_i$ with $p_i \neq 2$, and integers v and w are odd to satisfy the properties:

$$v\pi+1 \geq q_{min} \quad \text{(P2')}$$

$$(v+w)\pi-1 \leq q_{max} \quad \text{(P3')}$$

Figure 4:
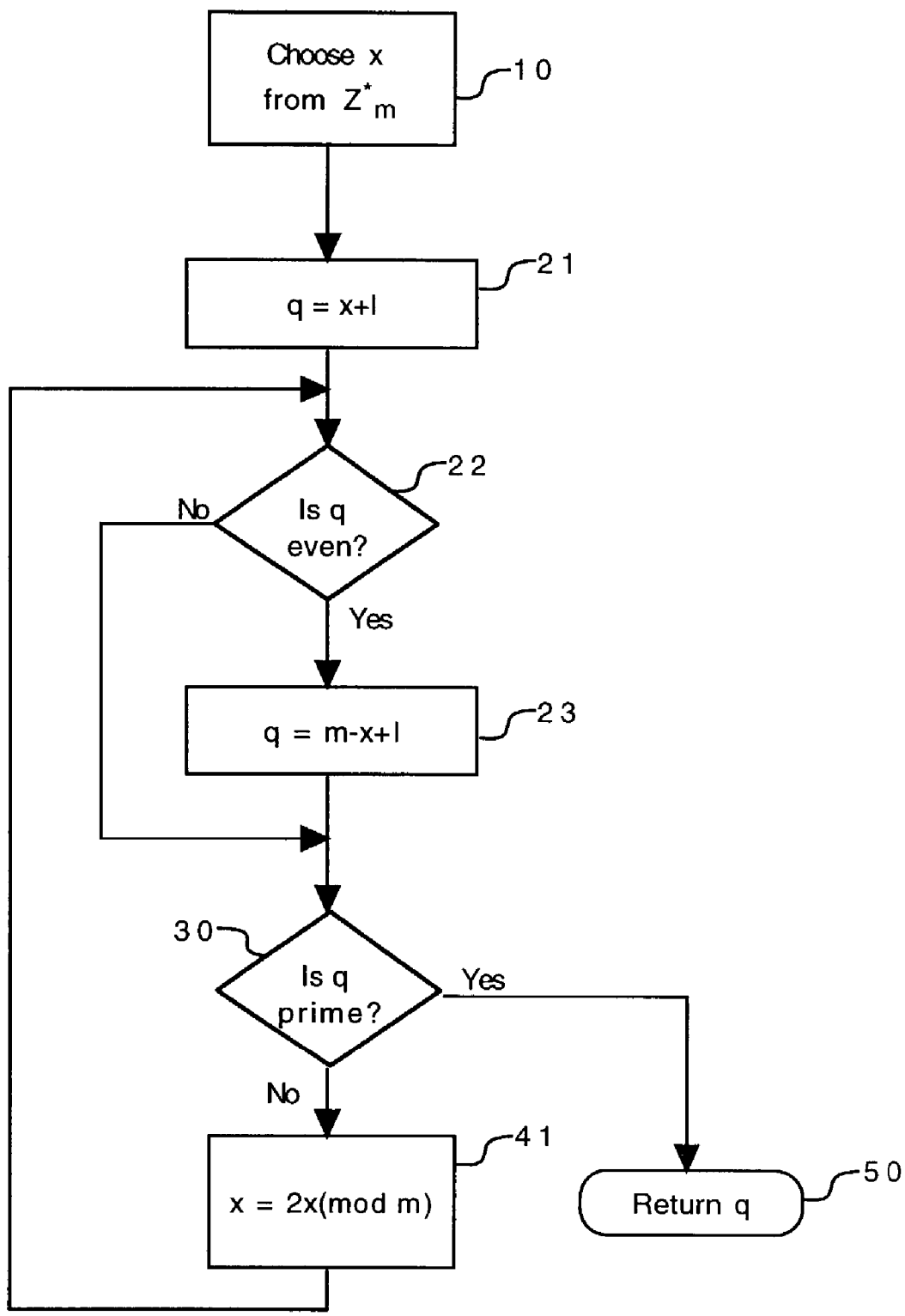
FIG. 4 is a flow chart of a preferred embodiment of the invention.

The modified algorithm is illustrated in the flow chart of FIG. 4. At step 10, a number x is randomly chosen from $Z_m^*$. At step 21, q is set to be equal to x+1, and at step 22 a determination is made whether q is even. If so, at step 23 q is set to be equal to m−x+1. More particularly, if x+1 is even, then m−x+1 is odd since m−x+1=m+(x+1)=m=1(mod 2). Hence, q is prime to $2\pi$, i.e., gcd(q,2)=1 since q is odd and gcd(q,$\pi$)=1 since q=±x(mod $\pi$) and ±x is included in $Z_\pi^*$.

At step 30, q is checked for primality. If it is not prime, then x is set to 2x(mod m) at step 41, and the process returns to step 21. Once q is determined to be prime, it is returned at step 50, to generate the cryptographic key.

From the foregoing, it can be seen that the present invention provides a method for generating a random prime number within a predetermined interval, that only requires the precalculation of a single value, $\pi$. Furthermore, the properties of this value enable it to be used for multiple different intervals. For instance, if the value of $\pi$ is precalculated for a corresponding interval [$q_{min}$, $q_{max}$], it is possible to generate a prime number within the interval [$2^k q_{min}$, $2^k q_{max}$] by setting $\pi=2^k\pi$ as a parameter of the prime number generating algorithm, since the properties of the pre-calculation phase are preserved. Hence, a single precalculated value for $\pi$ can be used to generate prime numbers of any size which need not be pre-specified. As an added advantage, the algorithm is very easy to implement with a coprocessor, since it only requires modular calculation.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method for generating a random prime number within a predetermined interval [$q_{min}$, $q_{max}$] in a portable electronic device for cryptographic operations, comprising the following steps:
   (i) calculating a value $\pi=\Pi_i p_i$, where $p_i$ is a set of prime numbers, and two values v and w exist such that $v\pi \geq q_{min}$ and $(v+w)\pi-1 \leq q_{max}$;
   (ii) selecting a random value x;
   (iii) calculating a candidate number $q=x+v\pi$;
   (iv) determining whether q is a prime number;
   (v) providing q as the generated random prime number if it is prime;
   (vi) repeating steps (iii)–(v) with a new value for x when q is not prime; and
   (vii) generating a cryptographic key using q.

2. The method of claim 1 wherein the new value for x is obtained by the product x=ax (mod m), where m=w$\pi$.

3. The method of claim 2 wherein a and x are selected from the set of invertible elements modulo m.

4. The method of claim 2 wherein m is an odd number, and a=2.

5. The method of claim 4 wherein v and w are odd numbers.

6. The method of claim 4 wherein $p_i \neq 2$.

7. The method of claim 1 wherein v and w are odd numbers.

8. The method of claim 1 further including the step of defining a quality parameter $0 < \epsilon \leq 1$, and choosing $\pi$ such that:

$$1-\epsilon < \frac{w\pi - 1}{q_{max} - q_{min}} \leq 1.$$

9. The method of claim 8 wherein $\epsilon \leq 10^{-3}$.

10. A portable electronic device having a computer-readable medium containing a program for generating random prime numbers within a predetermined interval [$q_{min}$, $q_{max}$] and generating a cryptographic key, which executes the following steps:
   (i) calculating a value $\pi=\Pi_i p_i$, where $p_i$ is a set of prime numbers, and two values v and w exist such that $v\pi \geq q_{min}$ and $(v+w)\pi-1 \leq q_{max}$;
   (ii) selecting a random value x;
   (iii) calculating a candidate number $q=x+v\pi$;
   (iv) determining whether q is a prime number;
   (v) providing q as the generated random prime number if it is prime;
   (vi) repeating steps (iii)–(v) with a new value for x when q is not prime; and
   (vii) generating a cryptographic key using q.

11. The portable electronic device of claim 10 wherein the new value for x is the product x=ax (mod m), where m=w$\pi$.

12. The portable electronic device of claim 11 wherein a and x are selected from the set of invertible elements modulo m.

13. The portable electronic device of claim 11 wherein m is an odd number, and a =2.

14. The portable electronic device of claim 13 wherein v and w are odd numbers.

15. The portable electronic device of claim 13 wherein $p_i \neq 2$.

16. The portable electronic device of claim 10 wherein v and w are odd numbers.

* * * * *